United States Patent
Friesen et al.

(10) Patent No.: US 9,158,293 B2
(45) Date of Patent: Oct. 13, 2015

(54) TRAIN PROFILE EVALUATION SYSTEM AND METHOD

(71) Applicant: General Electric Company, Schenectady, NY (US)

(72) Inventors: Abram Christopher Friesen, Sunset Valley, TX (US); Bex George Thomas, Ballston Lake, NY (US); Ilkin Onur Dulgeroglu, Niskayuna, NY (US); Edward McQuillan, Lisle, IL (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 13/924,111

(22) Filed: Jun. 21, 2013

(65) Prior Publication Data

US 2014/0018954 A1    Jan. 16, 2014

Related U.S. Application Data (60) Provisional application No. 61/669,778, filed on Jul. 10, 2012.

(51) Int. Cl.
| | | |
|---|---|---|
| G06F 7/00 | (2006.01) | |
| B61D 17/00 | (2006.01) | |
| G05B 15/02 | (2006.01) | |
| G06Q 10/08 | (2012.01) | |

(52) U.S. Cl.
CPC ............. *G05B 15/02* (2013.01); *G06Q 10/083* (2013.01)

(58) Field of Classification Search
None
See application file for complete search history.

(56) References Cited

U.S. PATENT DOCUMENTS

| | | | |
|---|---|---|---|
| 8,452,527 B2* | 5/2013 | Tan et al. | 701/300 |
| 2011/0056406 A1* | 3/2011 | Iden | 105/1.1 |
| 2014/0263860 A1* | 9/2014 | Iden et al. | 246/187 A |

\* cited by examiner

*Primary Examiner* — Yolanda Cumbess
(74) *Attorney, Agent, or Firm* — GE Global Patent Operation (57) ABSTRACT

Systems and methods for determining how to stack containers/trailers on a vehicle consist at a terminal/yard at least to maintain aerodynamic efficiency. Embodiments of the present invention provide a terminal management software application configured to determine how to stack containers/trailers on vehicles of a vehicle consist, taking into account a resultant aerodynamic efficiency of the vehicle consist during transit as well as other factors.

23 Claims, 3 Drawing Sheets

TRAIN PROFILE EVALUATION SYSTEM AND METHOD

This U.S. patent application claims priority to and the benefit of U.S. provisional patent application Ser. No. 61/669,778 filed on Jul. 10, 2012, which is incorporated herein by reference in its entirety.

BACKGROUND

1. Technical Field

The subject matter disclosed herein relates to methods and systems for determining how to stack containers/trailers on a vehicle consist (e.g., a train of rail cars) at a location (e.g., a railroad terminal or yard) to maintain aerodynamic efficiency of the vehicle consist during transit.

2. Discussion of Art

A given flat bed car of a train may be single stacked or double stacked with containers/trailers according to a set of rules. The set of rules take into account various factors. Such factors may include, for example, a weight limit of a car, a size of a car, a size of a container/trailer, locations on the train reserved for containers/trailers with hazardous materials, commercial prioritization (how containers/trailers are to be discharged from the train based on the priority of customers), and containers/trailers containing high value loads.

It may be desirable to have a system that accounts for different factors when assembling a train carrying containers/trailers than those systems and methods that are currently available.

BRIEF DESCRIPTION

Systems and methods for determining how to stack containers/trailers on a train at a railroad terminal/yard at least to maintain aerodynamic efficiency are disclosed. Embodiments of the present invention provide a terminal management software application configured to automatically (and/or with the aid of a user) determine how to stack containers/trailers on a train (or other vehicle consist), taking into account a resultant aerodynamic efficiency of the train as well as other factors.

In one embodiment, a system is provided that includes a controller operable to virtually allocate positions of containers on a vehicle consist having a plurality of vehicles for carrying the containers. The plurality of vehicles may include one of a plurality of rail cars, a plurality of mining ore carts, or a plurality of barges, for example. The controller is configured to allocate the positions of the containers based on an aerodynamic profile of the vehicle consist that would result when the containers are in allocated positions on the plurality of vehicles and in transit. The system also includes a user computer operatively interfacing to the controller, wherein the user computer may be configured to send commands to the controller, under operation of a user, indicating to the controller an allocation of the positions of the containers. The controller may be configured to recommend changes to the allocated positions based on an aerodynamic profile of the vehicle consist and communicate the recommended changes to the user computer, and the user computer may be configured such that the user may accept or reject the recommended changes. The controller may be configured to provide a secondary recommendation when the recommended changes are rejected by the user, or the user computer may be configured to allow the user to request that the controller provide a secondary recommendation.

In one embodiment, a method is provided that includes specifying at least one of aerodynamic characteristics or fuel savings for a vehicle consist having a plurality of vehicles, receiving first information associated with the vehicles of the vehicle consist and containers to be loaded onto the vehicles of the vehicle consist, and processing the received first information to determine a first stacked profile of the containers on the vehicles of the vehicle consist that results in the vehicle consist having at least one of the specified aerodynamic characteristics or fuel savings. The plurality of vehicles may include one of a plurality of rail cars, a plurality of mining ore carts, or a plurality of barges, for example. The received first information may include one or more of sizes/dimensions of the vehicles and the containers, weight limits of the vehicles, weights of the containers as loaded, types of hazardous materials loaded on the containers, commercial prioritization of the containers, and identification of the containers carrying high-value loads. The method may further include modifying the first stacked profile to determine a second stacked profile which trades off some of the aerodynamic characteristics or fuel savings to achieve at least one secondary requirement for the vehicle consist. The at least one secondary requirement may include one or more of protecting a high value load or specially positioning hazardous materials. The method may include receiving second information about the route to be traveled by the vehicle consist and processing the second information along with the first information to determine a first stacked profile of the containers on the vehicles of the vehicle consist that results in the vehicle consist having at least one of the specified aerodynamic characteristics or fuel savings. The second information may include one or more of available speed, speed restrictions, curves and straight sections, grade, wind speed, wind direction, temperature, or weather conditions, for example. The method may include calculating and displaying a cost savings associated with the specified aerodynamic characteristics or fuel savings of the first stacked profile.

In one embodiment, a method is provided that includes specifying at least one aerodynamic characteristic for a vehicle consist having a plurality of vehicles, receiving information associated with the vehicles and containers to be loaded onto the vehicles, and processing the received information to determine a stacked profile of the containers on the vehicles that results in the vehicle consist having at least one of the specified aerodynamic characteristics. The method may further include adjusting the stacked profile to form an updated stacked profile. The method may include fixing the updated stacked profile and assigning the containers to actually be stacked on the vehicles in accordance with the updated stacked profile.

In one embodiment, a system is provided that includes a terminal management controller operable to manage activities taking place within a terminal, and a user computer configured to communicate with the terminal management controller. The terminal management controller and the user computer are operable to facilitate the determination of a stacked profile of containers on rail cars of a rail vehicle consist. The stacked profile may result in the rail vehicle consist having aerodynamic characteristics that provide fuel savings for the rail vehicle consist. The stacked profile may further result in the rail vehicle consist having characteristics to protect a high value load or to specially position hazardous materials.

BRIEF DESCRIPTION OF THE DRAWINGS

Reference is made to the accompanying drawings in which particular embodiments of the invention are illustrated as described in more detail in the description below, in which.

DETAILED DESCRIPTION

Embodiments of the invention relate to methods and systems for positioning containers/trailers at a shipping terminal/yard for their subsequent transport. Such positioning may, for example, conserve fuel or reduce wear during transportation.

The terms "container" and "trailer" refer to a storage medium configured to hold products, goods, or other shippable materials and may be used interchangeably herein. The terms "terminal" or "yard" refer to a location and/or facility where products, goods, or other shippable materials in containers/trailers are shipped into and subsequently shipped out and may be used interchangeably herein. Such shipping may be, in one embodiment, by trains powered by locomotives on railroad tracks.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller", as used herein, refers to a system that includes the logic circuitry, memory, and/or processing devices and associated software, modules or programs. The terms "signal", "data", and "information" may be used interchangeably herein and may refer to digital or analog forms. The terms "configure", "stack", and "build" may be used interchangeably herein when referring to virtually or actually creating a profile of containers/trailers on cars or vessels of a vehicle consist or train.

Figure 1:
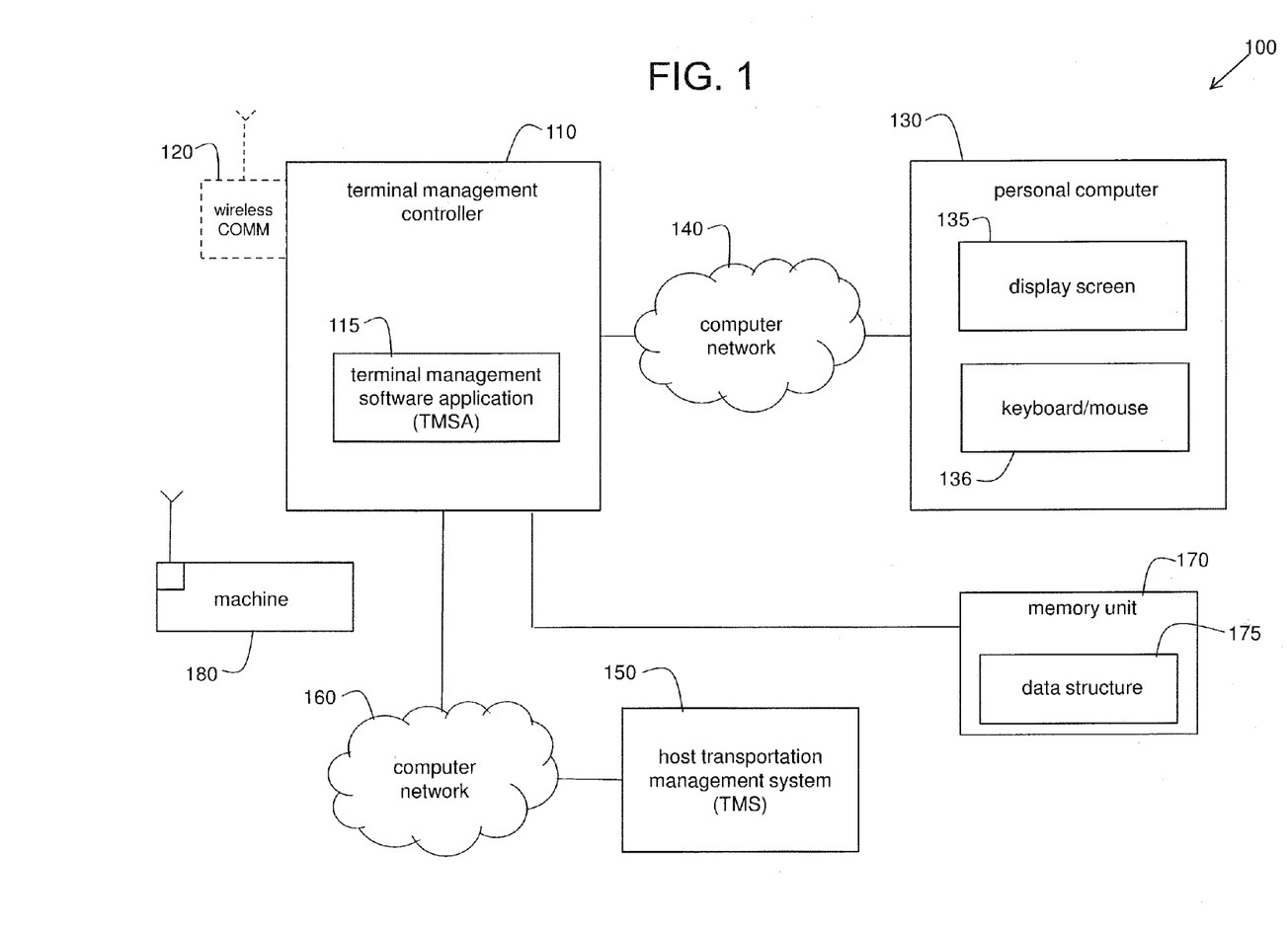
FIG. 1 is a schematic block diagram of an exemplary embodiment of a system for determining how to stack containers/trailers on a train at a railroad terminal/yard at least to maintain aerodynamic efficiency of the train.

FIG. 1 is a schematic block diagram of an exemplary embodiment of a system 100 for determining how to stack containers/trailers on a vehicles (e.g., rail cars) of a vehicle consist (e.g., a train) at a shipping terminal/yard at least to maintain aerodynamic efficiency of the vehicle consist. The shipping terminal may be, for example, a railroad intermodal terminal, a yard, a loading/unloading dock, a distribution center, or any location and/or facility where products, goods, or other shippable materials in containers/trailers are shipped into and subsequently shipped out of, for example, by trains on railroad tracks. In accordance with other embodiments, the vehicles may be mining ore carts or barges, for example.

The system 100 includes a terminal management controller 110 operable to manage transactions and activities taking place within a shipping terminal. In accordance with an embodiment, the terminal management controller 110 is implemented as a server computer 110 running a terminal management software application (TMSA) 115. The terminal management controller 110 manages transactions and activities that take place within the shipping terminal (e.g., deliveries to the shipping terminal, pick-ups from the shipping terminal, movement of containers and trailers within the shipping terminal, stacking of containers and trailers on rail cars of trains). The system 100 may include a memory unit 170 operably coupled to the controller 110. In accordance with an embodiment, the controller 110 is configured to control a data structure 175 in the memory unit 170 for allocating the positions of containers based, at least in part, on information received by the controller 110 relating to at least one of the containers or vehicle consist.

As an option, the system 100 may include a wireless communication (COMM) device 120 operably interfacing to the server computer 110 and configured to communicate with other wireless devices (e.g., via radio frequency communication) operating within the railroad terminal Such other wireless devices may be hand-held devices used by inspectors, or may be located in machines 170 (e.g., cranes or other on-site transportation vehicles) within the shipping terminal, and are configured to communicate with the terminal management controller 110.

The system 100 also includes a user computer 130 (e.g., a personal computer) having a user interface including a display screen 135 and a keyboard and/or mouse 136. The user computer 130 also includes a processing element (not shown) and is configured to communicate with the terminal management controller 110 either directly or via a computer network 140. The user computer 130 may be located in an office on site at the shipping terminal, or may be remotely located away from the shipping terminal.

The system 100 also includes a host transportation management system (TMS) 150 in operative communication with the terminal management controller 110 via, for example, a computer network 160. The TMS 150 is configured to manage various aspects (e.g., scheduling, tracking, way billing, revenue accounting) of a larger transportation system such as, for example, an entire railroad. Therefore, the TMS 150 may communicate with a plurality of terminal management controllers 110 at a plurality of railroad terminals of the railroad.

In accordance with various other embodiments of the present invention, the system 100 may be configured in various other ways. For example, if the terminal management controller 110 is on site at the railroad terminal, the user computer 130 may communicate in a direct wired manner with the controller 110, or via a communication network 140 which is a local area network. If the terminal management controller 110 is remotely located from the railroad terminal, then communication with the user computer 130 may be via the internet. For example, the terminal management controller 110 may be co-located with or be implemented on a same server computer as the TMS 150. As another example, the terminal management controller 110 may be hosted at a third party site (e.g., a provider of the TMSA) as a software-as-a-service (SaaS) configuration. As a further example, the computer networks 140 and 160 may be the same network (e.g., the internet). Other configurations are possible as well, in accordance with various other embodiments of the present invention.

In general, a rail car may be single-stacked (i.e., loaded with one container/trailer) or double-stacked (i.e., loaded with two containers/trailers, one stacked on top of the other). Gaps between containers/trailers on adjacent rail cars tend to affect the aerodynamics of a train. For example, if 40 foot long containers are placed in adjacent rail cars that are 53 feet long, then a 6½ foot gap is created on both sides of the rail cars (assuming the containers are centered in the rail cars), creating a 13 foot gap between adjacent rail cars. Such gaps may increase drag and reduce aerodynamic efficiency. Also, in a pre-dominantly double-stacked train configuration, any single stacks tend to create wind drag. Increasing wind drag may result in reduced aerodynamic efficiency of a train. Reduced aerodynamic efficiency may result in increased specific fuel consumption (SFC), increased wear on the powered vehicle (such as an engine), and increased wear on the rails (in the case of a locomotive in a rail-based embodiment).

In accordance with an embodiment, the terminal management controller 110 is configured to receive information associated with rail cars and containers/trailers to be loaded onto the rail cars in the railroad terminal/yard. Such information may include the sizes/dimensions of the rail cars and containers/trailers, weight limits of the rail cars, weights of the containers/trailers (as loaded with products, goods, materials), types of hazardous materials (if any) loaded on the containers/trailers, commercial prioritization of the containers/trailers, and identification of container/trailers carrying high-value loads. Such information may be provided by the host TMS 150 and/or by other wired or wireless devices operating within the railroad terminal/yard (e.g., portable hand-held devices used by personnel within the yard). In accordance with an embodiment, at least some of the information may be acquired by reading the containers via radio frequency identification (RFID) or Automatic Equipment Identification (AEI) technology and sending the information to the controller.

For example, if a flat car having a particular weight limit is loaded with a first container/trailer that takes up 75% of the weight limit, a second container/trailer may not be available to stack on top of the first container/trailer without exceeding the weight limit of the flat car. Therefore, the flat car will remain single-stacked. Also, in general, any pair of stacked containers are required to go to the same destination. Therefore, if there are an odd number of containers going to a same destination, one rail car may end up with just one container. Furthermore, it may be desirable to load containers having high commercial priority on the top of a double-stack, such that those containers get unloaded first at their destination. Containers having high-value loads, however, may be placed on the bottom of a double-stack to provide better protection. There may also be a requirement to place containers carrying hazardous materials at certain positions in the train for safety reasons.

Additional information may be received by the terminal management controller as well, in accordance with an embodiment. The additional information may include information about the route to be traveled by the vehicle consist (e.g., train of railcars) such as available speed of the vehicle consist, speed restrictions along the route, curves and straight sections along the route, the grade along the route, wind speed and direction along the route, temperature along the route, or other weather conditions along the route, for example.

The terminal management controller 110 is configured to process the received information and apply a set of rules (as defined as part of the terminal management software application, TMSA 115) to determine how various rail cars and containers/trailers should be configured and stacked to form a train that meets specified aerodynamic characteristics and/or provides a specified fuel savings for one or more locomotives pulling the train of loaded rail cars. In accordance with an embodiment, the TMSA 115 running on the terminal management controller 110 is programmed to automatically determine a stacked configuration of the train with limited or no input or feedback from the user via the user computer 130.

In accordance with another embodiment, a user, using the user computer 130, may interact with the terminal management controller 110 to virtually "build" the train. For example, the user may, using the user computer 130, manually or semi-automatically virtually "build" a stacked configuration of the train. A representation of the virtually built configuration may be displayed to a user on the display screen 135 of the user computer 130 as the user virtually "builds" the train. Similarly, the user may, via the user computer 130, interact with the terminal management controller 110 to manually or semi-automatically "build" an initial virtual stacked configuration or profile of the train. However, subsequently, the terminal management controller 110 may recommend or suggest certain changes to be made to the initial virtual configuration of the train, for example, to improve aerodynamic characteristics (e.g., reduce drag) to improve fuel savings.

Alternatively, the terminal management controller 110 may automatically determine an initial virtual configuration of the train when commanded by the user computer 130 and display a representation of the initial virtual configuration to a user on a display screen 135 of the user computer 130. The initial virtual configuration may optimize aerodynamic efficiency and/or maximize fuel savings. Subsequently, the user may, via the user computer 130, interact with the terminal management controller 110 to manually modify the initial virtual configuration. For example, the user may decide that he is willing to sacrifice some fuel savings in order to better protect a high value load by placing the containers/trailers carrying the high value load in a lower stacked position on rail cars near the front of the train.

In determining a stacked profile of the containers/trailers of a train, the terminal management controller 110 takes into account the various constraints, specifications, and requirements for the rail cars and the containers/trailers as discussed herein and applies a set of programmed rules. The programmed rules include rules for stacking the containers/trailers on the rail cars to optimize, or at least improve, the aerodynamic efficiency of the resultant train, which saves fuel used by the locomotive pulling the train. In accordance with an embodiment, as the terminal management controller 110 is virtually building a train, the terminal management controller 110 is providing information to the user computer 130 informing the user of, for example, the achieved or expected aerodynamic efficiency and/or fuel savings. If a user manually modifies the virtual configuration, the terminal management controller 110 updates the effect on aerodynamic efficiency and/or fuel savings and reports the effect to the user computer 130.

In accordance with an embodiment, the terminal management controller 110 is programmed to make or recommend tradeoffs. For example, if a user demands a specified fuel savings, the terminal management controller 110 may determine that another desired requirement or characteristic (e.g., a desired commercial prioritization of the containers/trailers) cannot be met. The terminal management controller 110 can inform the user of the tradeoff and allow the user to accept or reject the tradeoff. The terminal management controller 110 may also inform the user how much fuel savings needs to be sacrificed to meet the other desired characteristic.

In general, the user can interact with the terminal management controller 110 via the user computer 130 to iteratively arrive at an acceptable virtual stacked configuration for the train, making various tradeoffs along the way. Whenever the virtual stacked configuration/profile of the train is changed, adjusted, or updated, the terminal management controller 110 may re-compute the resultant aerodynamic efficiency and/or fuel savings and present the updated aerodynamic efficiency and/or fuel savings to the user via the user computer 130. Furthermore, the controller may provide secondary recommendations when initial recommended changes are rejected by the user, or the user computer may allow the user to request that the controller provide secondary recommendations.

In accordance with an embodiment, the display screen of the user computer allows for touch screen graphical re-arrangement of the stacked profile. Furthermore, side-by-side profiles of, for example, the top three most aerodynamic configurations may be displayed, allowing a user to select or modify one of the profiles for an actual build in the yard or terminal. Location of containers in the yard or terminal may be taken into account when determining a stacked profile. For example, if a two-stack profile is determined for a certain location on the train, and two containers are available matching the space in the line-up at that location, those two containers may be selected instead of containers that are further away.

Figure 2:
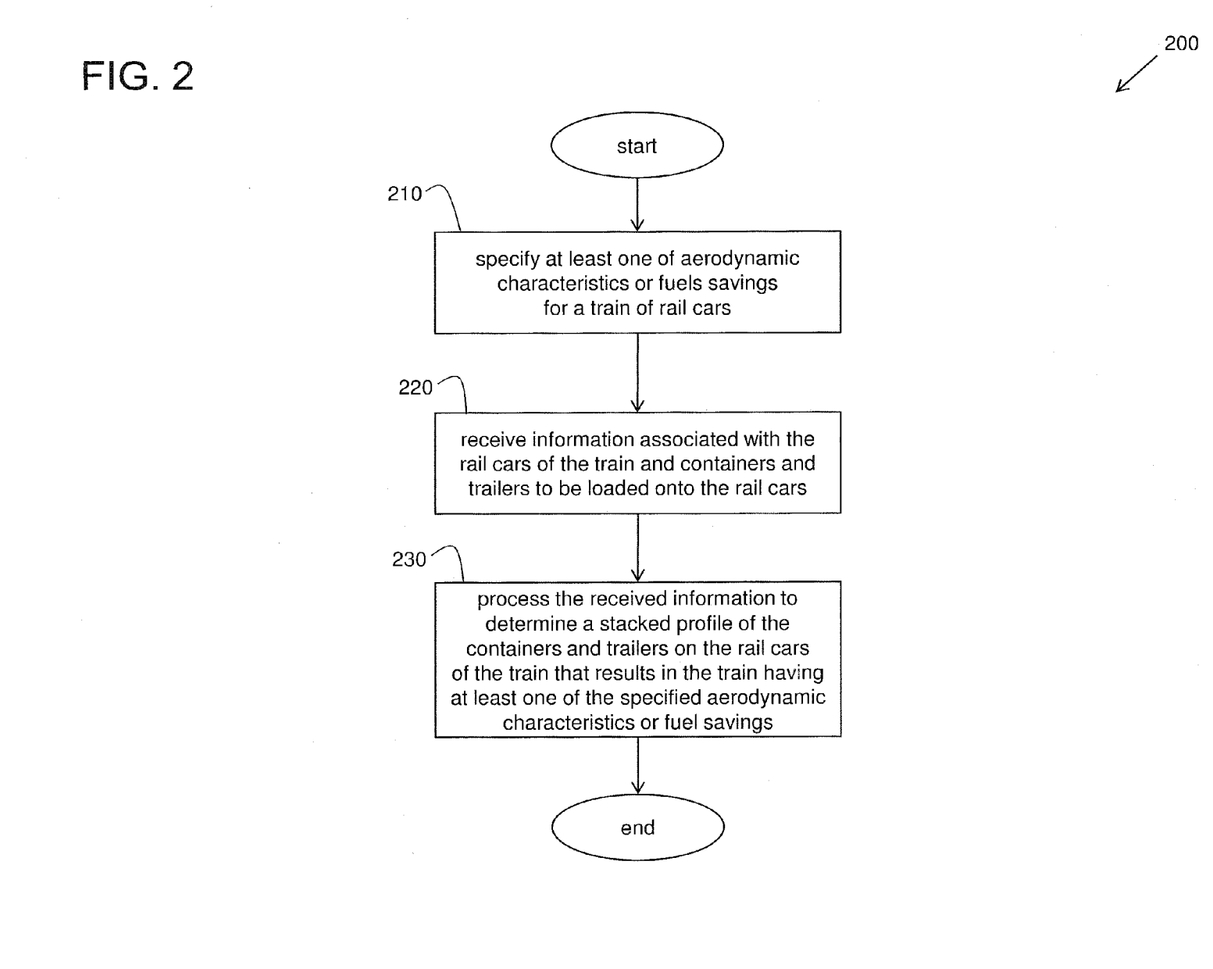
FIG. 2 illustrates a flow chart of an exemplary embodiment of a method for determining how to stack containers/trailers on a train at a railroad terminal/yard at least to maintain aerodynamic efficiency of the train using the system of FIG. 1.

FIG. 2 illustrates a flow chart of an exemplary embodiment of a method 200 for determining how to stack containers/trailers on a train at a railroad terminal/yard at least to maintain aerodynamic efficiency of the train using the system 100 of FIG. 1. In step 210, the method includes specifying (e.g., via the user computer 130) at least one of aerodynamic characteristics or fuel savings for a train of rail cars. An aerodynamic characteristic may be specified as a level of acceptable wind drag, for example. The fuel savings may be specified as a percent fuel savings over that of a known fuel consumption of a "standard" train making the same trip. A "standard" train may be a train having some nominal or average characteristics, including a standard number of loaded rail cars, for example.

In step 220, the method includes receiving information associated with the rail cars of the train and the containers/trailers to be loaded onto the rail cars of the train. Again, such received information may include the sizes/dimensions of the rail cars and containers/trailers, weight limits of the rail cars, weights of the containers/trailers (as loaded with products, goods, materials), types of hazardous materials (if any) loaded on the containers/trailers, commercial prioritization of the containers/trailers, and identification of container/trailers carrying high-value loads.

If information is available to the terminal management controller 110 from the TMS 150 corresponding to containers/trailers that have not yet arrived at the railroad terminal/yard but are due to arrive before the train leaves the yard, the system 100 and the user may be able to do a better job of virtually "building" the train to meet aerodynamic and/or fuel consumption goals using, at least in part, some of the container/trailers that have not yet arrived. In step 230, the method includes processing the received information to determine a stacked profile of the containers/trailers on the rail cars of the train that results in the train having at least one of the specified aerodynamic characteristics or fuel savings. In accordance with an embodiment, steps 220 and 230 are performed by the TMSA 115 on the terminal management controller 110. The method may include calculating and displaying a cost savings associated with the specified aerodynamic characteristics or fuel savings of the stacked profile. The cost savings may take into account considerations such as, for example, delay time to build the stacked profile in the yard or terminal based on the relative locations of cars and containers in the yard.

In one embodiment, an aerodynamic characteristic can be specified based on an empirical approach or rule set based on what has worked in the past. For example, all gaps in the train of cars may be closed to minimize the saw-tooth profile, and double stacks may be loaded toward the front of the train with single stacks loaded toward the rear of the train. Non-standard containers may be placed in proximity to each other and may be biased. Alternatively, a model may be used to take into account any number of dynamic factors to rank placement vs. effect, and optimize the overall solution using an algorithm.

Figure 3:
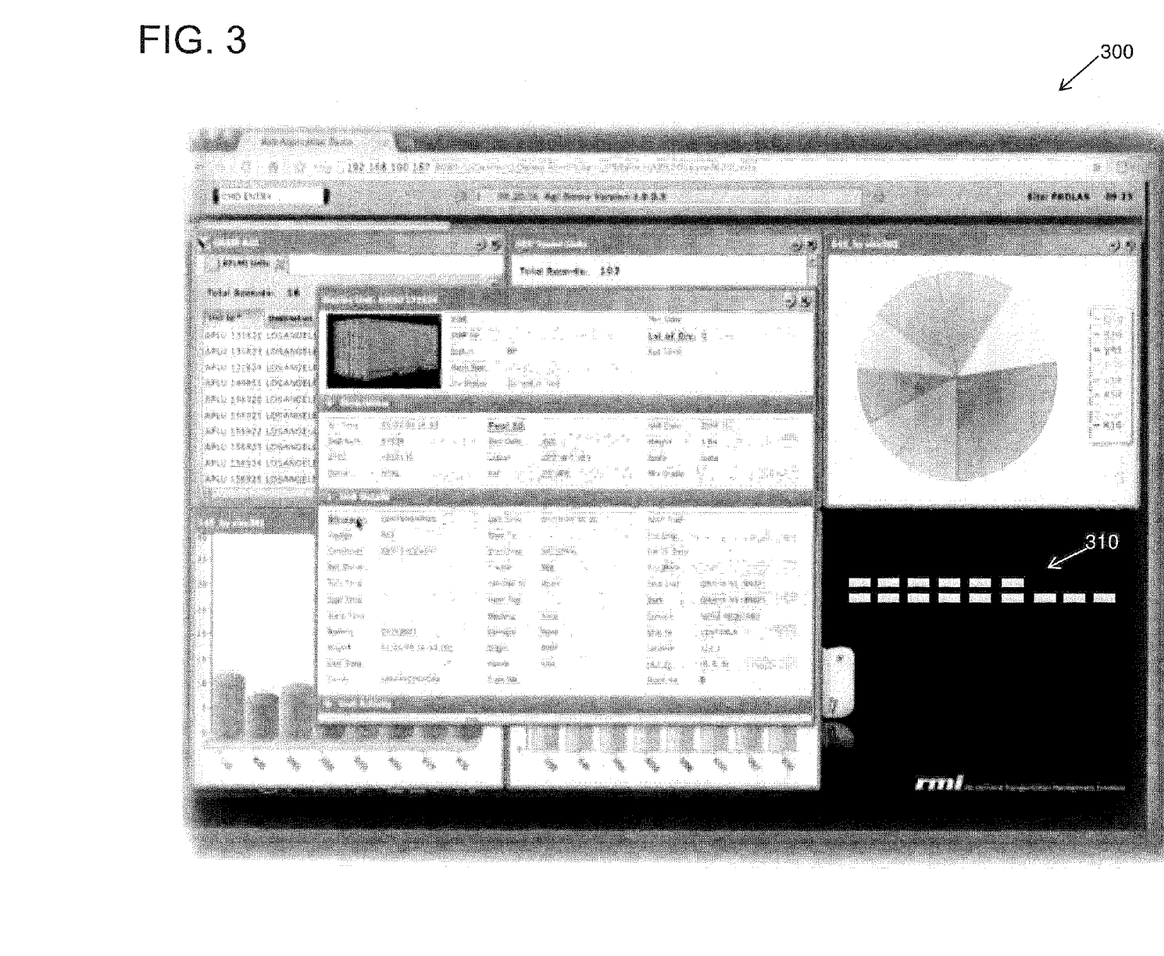
FIG. 3 shows an exemplary embodiment of a screen shot provided by the system of FIG. 1 illustrating a resultant stacking configuration of containers/trailers on rail cars of a train that provides aerodynamic characteristics that result in fuel savings for the train.

FIG. 3 shows an exemplary embodiment of a screen shot 300 provided by the system of FIG. 1 illustrating a resultant stacking configuration 310 of containers/trailers on rail cars of a portion of a train that provides aerodynamic characteristics that result in fuel savings for the train. Once a virtual stacked profile of containers/trailers on a plurality of rail cars is generated, a user of the user computer 130 may fix the stacked configuration and assign the containers/trailers to actually be stacked on the corresponding rail cars in the real world (i.e., in the shipping yard). Work orders may be sent out to personnel in the yard by the terminal management controller 110 to actually build the train in the real world according to the virtual configuration determined using the system of FIG. 1.

If a yard worker receiving a work order determines that the work order cannot be fulfilled for some reason (e.g., a particular rail car is damaged or disabled and cannot be used, or a particular container/trailer is damaged in such a way that it cannot be stacked on top of another container/trailer as indicated in the work order), then such information may be communicated from the yard worker to the terminal management controller 110 (e.g., via a wireless hand-held device). The terminal management controller 110 may receive the information and alert a user of the user computer 130 to the problem. The user may then command the terminal management controller 110 to determine an updated configuration of the train, taking into account the new information from the yard worker. A new work order (or work orders) may be sent out based on the updated configuration.

In accordance with an embodiment, once a virtual stacked profile is determined, the TMSA may interface with the yard's train-building software to transmit the stacked profile information and trigger certain yard switches to be switched to facilitate the actual building of the stacked profile in the yard.

An embodiment relates to a system comprising a controller operable for allocating positions of containers on a vehicle consist having a plurality of vehicles for carrying the containers. For example, the allocating may be done by the controller automatically, based on information about the containers, contents of the containers, the vehicle consist, the vehicles, a route of the vehicle consist/vehicles, or a schedule of the consist/vehicles. The positions that are allocated may include stacked positions of the containers on top of one another, for meeting one or more designated vehicle consist aerodynamic criteria, and/or for reducing aerodynamic drag versus positioning (including stacking) the containers in some other way.

In another embodiment, the system further comprises a memory unit, wherein the controller is operably coupled to the memory unit. The controller is configured to receive first information relating to at least one of the containers or the vehicle consist. The controller is also configured to control a data structure in the memory unit for allocating the positions of the containers, based at least in part on the first information. The controller is further configured to output first signals for the containers to be positioned on the vehicle consist according to the positions that are allocated.

For example, according to aspects, the first signals may comprise control signals for controlling a user interface to display information relating to the positions of the containers that are allocated. (The information that is displayed, for example, can be used by operators as a basis for stacking the containers on particular vehicles of the consist and/or as a basis for assembling the vehicles into the consist in a certain order.) As another example, the first signals may comprise control signals for controlling a machine to at least partially automatically assemble the vehicle consist according to the positions of the containers that are allocated and/or move the containers from an off-board location onto the vehicles of the vehicle consist according to the positions of the containers that are allocated. (At least partially automatically means fully automatically, without any human contribution, or with some steps carried out automatically by the machine without human contribution and other steps involving human contribution. The machine, for example, may be a container loader.)

In another embodiment, the positions that are allocated include one or more stack positions on at least one of the plurality of the vehicles of the vehicle consist. Each of the one or more stack positions comprises at least a respective two of the containers stacked on top of one another. The controller is configured to automatically determine the stack positions to reduce wind drag of the vehicle consist during movement of the vehicle consist along a route, relative to positioning stacks of the containers on the vehicle consist randomly or otherwise in a manner other than according to the stack positions that are determined. (Randomly means without a pre-arranged plan of positions, and/or without taking air drag into consideration when positioning the containers relative to the consist as a whole.)

In another embodiment, the controller is configured to allocate the positions of the containers based on an aerodynamic profile of the vehicle consist that would result when the containers are in allocated positions on the plurality of vehicles and in transit.

In another embodiment, the system further comprises a user computer operatively interfaced to the controller. The user computer is configured to send signals to the controller, under operation of a user, indicating to the controller a user allocation of the positions of the containers.

In another embodiment, the controller is configured to recommend changes to the user allocation based on an aerodynamic profile of the vehicle consist and to communicate the changes that are recommended to the user computer.

In another embodiment, the user computer is configured to receive a first input indicative of the user accepting the changes that are recommended and a second input indicative of the user rejecting the changes that are recommended.

In another embodiment, the controller is configured to at least one of automatically provide a secondary recommendation responsive to the user computer receiving the second input, or provide the secondary recommendation responsive to the user computer receiving a third input indicative of the user requesting that the controller provide the secondary recommendation.

In another embodiment, the plurality of vehicles includes one of a plurality of rail cars, a plurality of mining ore carts, or a plurality of barges. Thus, the vehicle consist might be a train, a mining consist, or a barge consist, respectively.

In another embodiment, the system further comprises a user computer operatively interfaced to the controller. The user computer is configured to send signals to the controller, under operation of a user, indicating to the controller a user allocation of the positions of the containers. Further, the controller is configured to recommend changes to the user allocation based on an aerodynamic profile of the vehicle consist and to communicate the changes that are recommended to the user computer. The user computer is configured to receive a first input indicative of the user accepting the changes that are recommended and a second input indicative of the user rejecting the changes that are recommended. The controller is configured to at least one of automatically provide a secondary recommendation responsive to the user computer receiving the second input, or provide the secondary recommendation responsive to the user computer receiving a third input indicative of the user requesting that the controller provide the secondary recommendation.

Another embodiment relates to a method. The method comprises specifying at least one of aerodynamic characteristics or fuel savings for a vehicle consist having a plurality of vehicles. The method further comprises receiving first information associated with the vehicles of the vehicle consist and containers to be loaded onto the vehicles of the vehicle consist. The method further comprises processing the received first information to determine a first stacked profile of the containers on the vehicles of the vehicle consist that results in the vehicle consist having at least one of the aerodynamic characteristics or the fuel savings that are specified.

In another embodiment of the method, the received first information includes one or more of size information relating to sizes of the vehicles and the containers, weight limits of the vehicles, weights of the containers as loaded, types of hazardous materials loaded on the containers, commercial prioritization of the containers, or identification of one or more of the containers carrying loads having values greater than a designated threshold.

In another embodiment of the method, the method further comprises modifying the first stacked profile to determine a second stacked profile which modifies at least some of at least one of the aerodynamic characteristics or the fuel savings to achieve at least one secondary requirement for the vehicle consist.

In another embodiment of the method, the at least one secondary requirement includes one or more of protecting a designated load or specially positioning hazardous materials.

In another embodiment of the method, the method further comprises receiving second information about the route to be traveled by the vehicle consist and processing the second information along with the first information to determine a first stacked profile of the containers on the vehicles of the vehicle consist that results in the vehicle consist having at least one of the specified aerodynamic characteristics or fuel savings.

In another embodiment of the method, the second information includes one or more of available speed, speed restrictions, curves and straight sections, grade, wind speed, wind direction, temperature, or weather conditions.

In another embodiment of the method, the method further comprises calculating and displaying a cost savings associated with the at least one of the specified aerodynamic characteristics or fuel savings of the first stacked profile.

In another embodiment of a method, the method comprises specifying at least one aerodynamic characteristic for a vehicle consist having a plurality of vehicles. The method further comprises receiving information associated with the vehicles and containers to be loaded onto the vehicles, and processing the received information to determine a stacked profile of the containers on the vehicles that results in the vehicle consist having at least one of the at least one specified aerodynamic characteristic.

In another embodiment of the method, the method further comprises adjusting the stacked profile to form an updated stacked profile.

Another embodiment relates to a system comprising a terminal management controller operable to manage activities taking place within a terminal. The system further comprises a user computer configured to communicate with the terminal management controller. The terminal management controller and the user computer are operable to facilitate the determination of a stacked profile of containers on rail cars of a rail vehicle consist. The stacked profile may result in the rail vehicle consist having aerodynamic characteristics that provide fuel savings for the rail vehicle consist relative to stacking the containers in a way other than as determined in facilitation with the terminal management controller and the user computer. According to another aspect, the stacked profile may further result in the rail vehicle consist having characteristics to protect a designated load or to specially position hazardous materials.

Although trains are referred to herein, all the embodiments are more generally applicable to rail vehicle consists and other vehicle consists. A rail vehicle consist is a group of rail vehicles that are mechanically linked together to travel along a track. (A train is one example of a rail vehicle consist. Another example is a set of mining ore carts.) A vehicle consist, more generally, is a group of vehicles that are mechanically linked together to travel along a route.

With reference to the drawings, like reference numerals designate identical or corresponding parts throughout the several views. However, the inclusion of like elements in different views does not mean a given embodiment necessarily includes such elements or that all embodiments of the invention include such elements.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
   a controller operable for allocating positions of containers on a vehicle consist having a plurality of vehicles for carrying the containers; and
   a memory unit, wherein the controller is operably coupled to the memory unit;
   the controller is configured to receive first information relating to at least one of the containers or the vehicle consist;
   the controller is configured to control a data structure in the memory unit for allocating the positions of the containers, based at least in part on the first information; and
   the controller is configured to output first signals for the containers to be positioned on the vehicle consist according to the positions that are allocated;
   wherein the positions that are allocated include one or more stack positions on at least one of the plurality of the vehicles of the vehicle consist, each of the one or more stack positions comprising at least a respective two of the containers stacked on top of one another, and wherein the controller is configured to automatically determine the stack positions to reduce wind drag of the vehicle consist during movement of the vehicle consist along a route, relative to positioning stacks of the containers on the vehicle consist randomly or otherwise in a manner other than according to the stack positions.

2. The system of claim 1, wherein the first signals comprise control signals for controlling a user interface to display information relating to the positions of the containers that are allocated.

3. The system of claim 1, wherein the first signals comprise control signals for controlling a machine to at least partially automatically at least one of assemble the vehicle consist according to the positions of the containers that are allocated or move the containers from an off-board location onto the vehicles of the vehicle consist according to the positions of the containers that are allocated.

4. The system of claim 1, wherein the plurality of vehicles includes one of a plurality of rail cars, a plurality of mining ore carts, or a plurality of barges.

5. A system, comprising:
a controller operable for allocating positions of containers on a vehicle consist having a plurality of vehicles for carrying the containers, wherein the controller is configured to allocate the positions of the containers based on an aerodynamic profile of the vehicle consist that would result when the containers are in allocated positions on the plurality of vehicles and in transit.

6. The system of claim 5, wherein the plurality of vehicles includes one of a plurality of rail cars, a plurality of mining ore carts, or a plurality of barges.

7. A system, comprising:
a controller operable for allocating positions of containers on a vehicle consist having a plurality of vehicles for carrying the containers; and
a user computer operatively interfaced to the controller, wherein the user computer is configured to send signals to the controller, under operation of a user, indicating to the controller a user allocation of the positions of the containers;
wherein the controller is configured to recommend changes to the user allocation based on an aerodynamic profile of the vehicle consist and to communicate the changes that are recommended to the user computer.

8. The system of claim 7, wherein the user computer is configured to receive a first input indicative of the user accepting the changes that are recommended and a second input indicative of the user rejecting the changes that are recommended.

9. The system of claim 8, wherein the controller is configured to at least one of automatically provide a secondary recommendation responsive to the user computer receiving the second input, or provide the secondary recommendation responsive to the user computer receiving a third input indicative of the user requesting that the controller provide the secondary recommendation.

10. The system of claim 7, wherein the plurality of vehicles includes one of a plurality of rail cars, a plurality of mining ore carts, or a plurality of barges.

11. A method comprising:
specifying at least one of aerodynamic characteristics or fuel savings for a vehicle consist having a plurality of vehicles;
receiving first information associated with the vehicles of the vehicle consist and containers to be loaded onto the vehicles of the vehicle consist; and
processing the received first information to determine a first stacked profile of the containers on the vehicles of the vehicle consist that results in the vehicle consist having at least one of the aerodynamic characteristics or the fuel savings that are specified.

12. The method of claim 11, wherein the received first information includes one or more of size information relating to sizes of the vehicles and the containers, weight limits of the vehicles, weights of the containers as loaded, types of hazardous materials loaded on the containers, commercial prioritization of the containers, or identification of one or more of the containers carrying loads having values greater than a designated threshold.

13. The method of claim 11, further comprising modifying the first stacked profile to determine a second stacked profile which modifies at least some of at least one of the aerodynamic characteristics or the fuel savings to achieve at least one secondary requirement for the vehicle consist.

14. The method of claim 13, wherein the at least one secondary requirement includes one or more of protecting a designated load or specially positioning hazardous materials.

15. The method of claim 11, wherein the plurality of vehicles include one of a plurality of rail cars, a plurality of mining ore carts, or a plurality of barges.

16. The method of claim 11, further comprising receiving second information about the route to be traveled by the vehicle consist and processing the second information along with the first information to determine a first stacked profile of the containers on the vehicles of the vehicle consist that results in the vehicle consist having at least one of the specified aerodynamic characteristics or fuel savings.

17. The method of claim 16, wherein the second information includes one or more of available speed, speed restrictions, curves and straight sections, grade, wind speed, wind direction, temperature, or weather conditions.

18. The method of claim 11, further comprising calculating and displaying a cost savings associated with the at least one of the specified aerodynamic characteristics or fuel savings of the first stacked profile.

19. A method comprising:
specifying at least one aerodynamic characteristic for a vehicle consist having a plurality of vehicles;
receiving information associated with the vehicles and containers to be loaded onto the vehicles; and
processing the received information to determine a stacked profile of the containers on the vehicles that results in the vehicle consist having at least one of the at least one specified aerodynamic characteristic.

20. The method of claim 19, further comprising adjusting the stacked profile to form an updated stacked profile.

21. The method of claim 20, further comprising assigning the containers to actually be stacked on the vehicles in accordance with the updated stacked profile.

22. A system comprising:
a terminal management controller operable to manage activities taking place within a terminal; and
a user computer configured to communicate with the terminal management controller,
wherein the terminal management controller and the user computer are operable to allow the determination of a stacked profile of containers on rail cars of a rail vehicle consist, and
wherein the stacked profile results in the rail vehicle consist having aerodynamic characteristics that provide fuel savings for the rail vehicle consist relative to stacking the containers in a way other than as determined in facilitation with the terminal management controller and the user computer.

23. The system of claim 22, wherein the stacked profile further results in the rail vehicle consist having characteristics to protect a designated load or to specially position hazardous materials.

* * * * *